Figure 1:
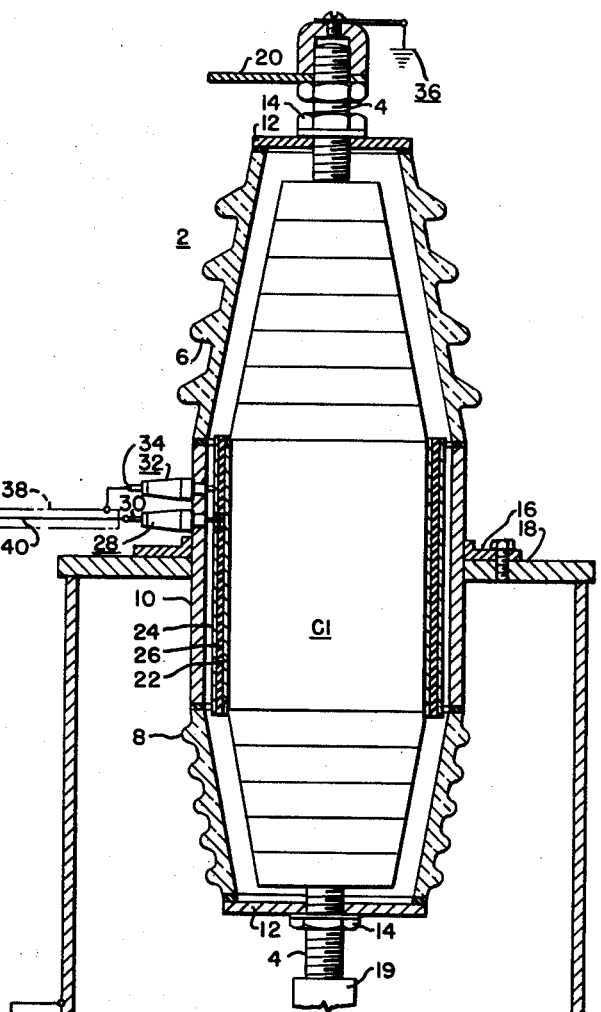

May 18, 1954  J. H. FRAKES  2,679,026
BUSHING TEST STRUCTURE
Filed Aug. 19, 1950

WITNESSES:
H. F. Susser
Wm. L. Groome

INVENTOR
James H. Frakes.
BY
ATTORNEY

Patented May 18, 1954

2,679,026

UNITED STATES PATENT OFFICE 2,679,026

BUSHING TEST STRUCTURE

James H. Frakes, Pittsburgh, Pa., assignor to Westinghouse Electric Corporation, East Pittsburgh, Pa., a corporation of Pennsylvania Application August 19, 1950, Serial No. 180,403

4 Claims. (Cl. 324—54)

The invention relates to bushings for high tension electrical apparatus such as transformers and circuit-breakers, and more particularly to improved facilities built into the bushing for testing the di-electric loss or power factor of the bushing.

Power factor testing, of course, is a well established practice, particularly for testing bushings in the field, but it is customary to apply the test potential to the bushing conductor and make the power factor or loss measurement on the insulation between the conductor and the grounded flange of the bushing. This, of course, introduces some error because of losses between the apparatus in the circuit-breaker or transformer tank, which is connected to the bushing conductor, and the grounded tank of the apparatus. This can be avoided, of course, by removing the bushing and breaking its connection with the electrical apparatus, but this is time consuming and troublesome. Testing of this kind is contemplated in Doble Patent 1,945,263 issued January 30, 1934 and Watts et al. 2,130,865 issued September 20, 1938. One way of avoiding the above-noted difficulty, at least so far as bushings of the condenser-type are concerned, is disclosed in Skvortzoff et al. 2,249,862 issued July 22, 1941 but the present construction and testing method is considered to be an improvement.

In accordance with the present invention the test potential, instead of being applied to the stud or conductor of the bushing, will be applied to a conducting layer or shell on the outside of the insulator wrapping or body, and with a ground connection made to the bushing stud or conductor a measurement may be made between the outer shell and the conductor without regard to any apparatus connected to the bushing conductor which, of course, will be at ground potential and will not affect the dielectric measurement.

It is an object of the invention, therefore, to provide an improved high tension bushing construction which incorporates simple means for facilitating an accurate measurement of the dielectric value of the bushing insulation, and it is also an object to provide an improved means for making power factor and dielectric loss measurements.

Figure 2:
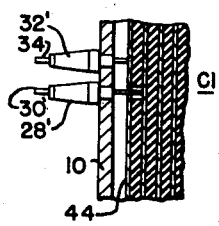

Referring to the drawing:

Figure 1 is a view partly in section and partly schematic of a bushing testing arrangement and construction in accordance with the invention, and Fig. 2 is a fragmentary view in section showing a modification of the bushing connections shown in Fig. 1.

Referring to Fig. 1 a bushing 2 may comprise a body of insulating material C1 which surrounds the bushing conductor 4 and is suitably supported thereby. As shown, body C1 comprises a wrapped insulation and it may be of the condenser type embodying alternate layers of metallic and insulating foil. This type of construction is well known and needs no further description.

The bushing casing comprises porcelain sections 6 and 8 which abut a central metallic collar or section 10 and the assembly is clamped together by end plates 12 and nuts 14 threaded to the bushing conductor. Of course, abutting edges of these parts may be gasketed as desired to obtain a fluid-tight enclosure.

The bushing is supported in operative position by means of a flange 16 suitably bolted about an opening in the cover 18 of the electrical apparatus with which the bushing is to be associated. In this case, by way of illustration, the apparatus may be a circuit-breaker having a contact 19 threaded to the lower end of the bushing conductor.

The upper end of the bushing conductor 4 is threaded to receive a terminal clamp, as indicated, for receiving a power conductor 20 which extends to a usual disconnect switch (not shown) in the line with which the bushing is to be associated.

The central portion of the bushing C1 is provided with a conducting surface 22, preferably co-extensive in length, along the axis of the bushing, with the width of the outer layer of the bushing winding. In the case of a condenser-type bushing, the layer 22 may be an additional layer of the metallic wrapping as is used in winding the bushing, or it may be a separate cylindrical shell pressed onto the bushing. Of course, if the insulating body C1 is of porcelain, the layer 22 may be a sprayed coating of silver, copper or other electrically conducting material.

The layer 22 is surrounded by a conducting cylinder 24 in spaced relation, and preferably insulated therefrom by a winding 26 of suitable dielectric material.

In order to make connections for testing the bushing insulation, a terminal 28 is provided including a lead 30 extending through a suitable insulator body portion through an opening in the side wall of the metal collar 10 into contact with the metallic layer 22. Similarly a terminal 32 is provided with a conducting lead 34 which extends through the bushing wall into contact with the metallic sleeve 24. Of course, a suitable opening is provided through the sleeve 24 and the insulation 26 so that lead 30 may pass therethrough in electrically insulated relation.

By way of example, the testing equipment may be of the inverted Schering Bridge type, as shown, for example, in said Watts et al. patent. This type of equipment is well known and comprises a standard capacitor C2 in a leg of the bridge adjacent to the capacitor represented by the bushing insulation C1 when the bushing stud is connected to ground as at 36. By manipulation of C4 and R3 a null reading is obtained upon the milliammeter A and by reading the values of C4 and R3 the power factor and capacitance of the bushing may readily be determined.

As is usual in testing equipment of this kind, a shield or guard is placed around the bridge and includes a shield 38 surrounding the test lead 40. With the test lead 40 connected to the lead 30 of bushing 20, the test potential is applied to the insulation C1 between the metal layer 22 and the bushing stud or conductor 4 which is temporarily grounded at 36. Then with a connection between the guard shield 38 and the terminal lead 34, the conducting shell 24 is connected in the guard circuit thereby diverting any leakage current between the conducting cylinder or layer 22 and the grounded structure of the bushing casing.

As indicated in Fig. 2, a further modification is possible in the case of a condenser type bushing by providing an additional external layer 44 of conducting material to the body of the bushing. The lead of terminal 32' may then contact the layer 44, and the terminal 28' has its lead 30' extending through an opening in the layer 44 and the first layer of insulating material into contact with the first metallic layer of the bushing winding. As a matter of fact, of course, the outer layer 44 may be omitted and suitable openings cut in the first and second layers of insulating material to utilize the first two metallic layers of the wound condenser bushing for the test purposes. On the other hand, on bushings provided with a tap for a potential device which is quite common, the metallic layer and terminal for such device may be used in place of the terminal 30 or 30'.

After a test has been made, of course, the ground connection 36 should be broken and the leads of terminals 28 and 32 may be left insulated from ground or grounded, as desired. Assuming that the bushing lead 29 is disconnected from the source of energy by a disconnecting switch, it is unnecessary to disconnect the lead from the bushing conductor 4 because the lead and conductor are both at ground potential at 36.

The construction and method of measurement described is quite simple and involves little modification of the actual structure of the bushing. Testing is facilitated and may be made in a manner free of error due to any apparatus connected to the bushing conductor. Quite obviously, modifications may present themselves, and it is intended that the invention is limited only by the spirit and scope of the appended claims.

I claim as my invention:

1. In a terminal bushing for high-tension encased electrical apparatus including a conducting stud having a portion of the length thereof surrounded by a substantially cylindrical body of insulating material, means comprising a conducting surface on the outer face of said body, a substantially cylindrical shell of conducting material surrounding said surface and spaced therefrom in electrically insulated relation, a casing enclosing said body and shell and secured to said stud with the ends of the stud projecting therefrom, means for mounting said casing in operative position on the casing of said electrical apparatus, means for testing the condition of said insulation comprising terminal means extending through said casing and insulated therefrom into contact with said conducting surface, a second terminal means extending through said casing and insulated therefrom into contact with said cylindrical shell, whereby a test potential from a shielded lead of a test equipment may be applied to said first mentioned terminal and the shield of said lead may be connected to said second terminal, and means for connecting said conducting stud to ground.

2. In a bushing for encased electrical apparatus in which a conducting stud is provided with a wrapped body of insulating material extending over a portion of its length, a first cylindrical shell of conducting material surrounding said wrapped body and in intimate contact therewith, a second cylindrical shell of conducting material concentric with and spaced about said first shell and electrically insulated therefrom, a casing enclosing said body and shells, means for impressing a test potential on said first shell including a test lead having a guard shield, means for electrically connecting said guard shield to said second mentioned shell, and means for bringing said stud to ground potential whereby the condition of said wrapped body of insulating material may be determined.

3. In a bushing insulator comprising a central conductor having an insulating wrapping thereon consisting of alternate layers of metallic and insulating sheet material, the outermost layer being metallic, means for impressing a test potential on said wrapping by means of a test lead having a concentric guard shield thereon comprising means affording an electrical connection between said outermost metallic layer and said guard shield, and means affording electrical connection between said test lead and the metallic layer of the bushing wrapping next adjacent to said outermost layer.

4. In a bushing insulator comprising a central conductor having an insulating wrapping thereon consisting of alternate layers of metallic and insulating sheet material, the outermost layer being metallic, means for impressing a test potential on said wrapping by means of a test lead having a concentric guard shield thereon and connected to a source of test potential one side of which is grounded, comprising means affording an electrical connection between said outermost metallic layer and said guard shield, means affording electrical connection between said test lead and the metallic layer next adjacent to said outermost layer, and means for grounding said central conductor.

References Cited in the file of this patent

UNITED STATES PATENTS

| Number | Name | Date |
| --- | --- | --- |
| 1,531,522 | Steinberger | Mar. 31, 1925 |
| 1,657,249 | Eby | Jan. 24, 1928 |
| 1,723,000 | Austin | Aug. 6, 1929 |
| 1,798,367 | Burnham | Mar. 31, 1931 |
| 2,013,537 | Eby | Sept. 3, 1935 |
| 2,130,865 | Watts et al. | Sept. 20, 1938 |
| 2,239,598 | Fawcett | Apr. 22, 1941 |
| 2,241,687 | Warnke | May 13, 1941 |
| 2,249,862 | Skvortzoff et al. | July 22, 1941 |
| 2,249,863 | Skvortzoff | July 22, 1941 |
| 2,402,466 | Terpak | June 18, 1946 |